(12) United States Patent
Long, III et al.

(10) Patent No.: US 7,058,583 B2
(45) Date of Patent: Jun. 6, 2006

(54) METHOD FOR CALCULATING PORTFOLIO SCALED IRR

(75) Inventors: Austin M. Long, III, Austin, TX (US); Craig J. Nickels, Marble Falls, TX (US)

(73) Assignee: Alignment Capital Partners, Austin, TX (US)

( * ) Notice: Subject to any disclaimer, the term of this patent is extended or adjusted under 35 U.S.C. 154(b) by 661 days.

(21) Appl. No.: 10/071,864

(22) Filed: Feb. 7, 2002

(65) Prior Publication Data
US 2003/0061169 A1    Mar. 27, 2003

Related U.S. Application Data

(60) Provisional application No. 60/266,648, filed on Feb. 6, 2001.

(51) Int. Cl.
*G06F 15/46* (2006.01)
(52) U.S. Cl. .............................. 705/1; 705/35
(58) Field of Classification Search .................. 705/35, 705/36
See application file for complete search history.

(56) References Cited

U.S. PATENT DOCUMENTS 6,640,204 B1 * 10/2003 Feldman ..................... 702/189

OTHER PUBLICATIONS

Journal of Financial Planning, Padgette, "Performance Reporting: The Basics and Beyond, Part 1", Jul. 1995.*
Real Estate Finance, Bradford et al., "Attributing manager value added to portfolio performance: A suggested improvement", 1999, vol. 16, Issue 2, p. 31.*

* cited by examiner

*Primary Examiner*—James P. Trammell
(74) *Attorney, Agent, or Firm*—Vinson & Elkins L.L.P.

(57) ABSTRACT

Process and system for evaluating the performance attribution of a private investment portfolio by comparing actual return to return for a portfolio converted to a neutral-weight portfolio in which all assets are based on the same starting date which is the earliest start date in the actual portfolio. Contribution of selection and timing of investments are also determined.

3 Claims, No Drawings

METHOD FOR CALCULATING PORTFOLIO SCALED IRR

CROSS REFERENCE TO RELATED APPLICATIONS

This application claims the benefit of U.S. Provisional Application No. 60/266,648, filed Feb. 6, 2001.

STATEMENT REGARDING FEDERALLY SPONSORED RESEARCH OR DEVELOPMENT

N/A

BACKGROUND OF THE INVENTION

It is well established in the literature of finance that the internal rate of return (IRR) of an investment is calculated by IRR=r where $$\sum_{i=0}^{n} \frac{CF_i}{(1+r)^i} = 0$$

It is also common knowledge in the finance industry and literature that the discount rate for actual IRR (r) and the discount rate for pro forma IRR ($r_{pf}$) are the same when all cash flows of an investment are multiplied by a constant k:

$$r = r_{pf} \text{ where } \sum_{i=0}^{n} \frac{kCF_i}{(1+r_{pf})^i} = 0$$

This is so because the relative weights of the cash flows are unchanged as a function of time when multiplied by a constant.

Another way to understand why multiplying each cash flow by a constant does not change the IRR of an investment is to look at the original investment as a bond and the IRR as its yield to maturity. It is obvious that buying two identical bonds at the same price on the same date and with the same cash flows (and thus the same yield to maturity) would result in a portfolio with the same yield to maturity as that of the underlying bonds. The same would be true of buying 4 bonds or k bonds. It is a small extension of the principle to apply the same notion to fractional bonds and thus to all the cash flows multiplied by any constant k.

Another technical definition of IRR is the discount rate required to make the positive cash flows (PCF) resulting from the investment equal to the negative cash flows (NCF) expended in acquiring the investment:

$$\sum_{i=0}^{n} \frac{NCF_i}{(1+r)^i} = \sum_{i=0}^{n} \frac{PCF_i}{(1+r)^i}$$

It is therefore mathematically obvious that $$\sum_{i=0}^{n} \frac{kNCF_i}{(1+r)^i} = \sum_{i=0}^{n} \frac{kPCF_i}{(1+r)^i}$$

An alternative method of IRR computation is referred to in the industry as the time-zero method. In the time-zero IRR method, all investments are presumed to begin at the same date (the zero date). In a 1995 white paper entitled *Opportunistic Investing: Performance Measurement, Benchmarking and Evaluation*, Richards and Tierney, a well-known consulting firm, has argued that the time-zero method is the best way to determine stock selection ability, since it neutralizes the relative timings of the acquisitions in a private market portfolio.

In the public markets, time weighted rate of return (TWROR) performance attribution has been refined to enable the analyst to determine the relative contribution of the stock index, sector allocation and stock selection in order to derive the manager's contribution, as shown in the numerical example below:

Performance Attribution Analysis

| | Stock Index | | | Analysis | | Managed Portfolio | | |
|---|---|---|---|---|---|---|---|---|
| Sector | Index Weight $W_M$ | Index Sector Return $R_M$ | I $W_M*R_M$ | II $R_M*W_P$ | III $W_M*R_P$ | Portfolio Weight $W_P$ | Portfolio Sector Return $R_P$ | IV $W_P*R_P$ |
| Consumer | 30.0% | 15.0% | 4.5% | 1.5% | 5.4% | 10.0% | 18.0% | 1.8% |
| Technology | 10.0% | 20.0% | 2.0% | 6.0% | 2.5% | 30.0% | 25.0% | 7.5% |
| Cyclical | 35.0% | 30.0% | 10.5% | 4.5% | 7.0% | 15.0% | 20.0% | 3.0% |
| Energy | 25.0% | −5.0% | −1.3% | −2.3% | 1.3% | 45.0% | 5.0% | 2.25% |
| | 100.0% | | 15.75% | 9.75% | 16.15% | 100.0% | | 14.55% |

| | | |
|---|---|---|
| I. Index return | | 15.75% |
| II. Index and portfolio allocation returns | | 9.75% |
| III. Stock selection | | 16.15% |
| IV. Portfolio return | | 14.55% |
| Attribution | | |
| Market index | I. | 15.75% |
| Asset allocation | II-I | −6.00% |
| Security selection | IV-II | 4.80% |
| Manager's total return | IV | 14.55% |
| Manager's contribution | IV-I | −1.20% |

The above analysis depends, in part, on the availability of the index as an investible alternative; and, in part, on the fact that performance is measured by TWROR, which ignores the timing of interim cash flows. Neither of these critical factors is available in the private markets—first, because there is no investible index in the private markets; and second, because the IRR computation takes into account the timing of all interim cash flows. Performance attribution in the private markets therefore does not yet exist in the same sense that it does in the public markets. Disclosed herein are new methods and means for determining performance attribution in the private markets that address the lack of an investible index, as well as the time/cash flow attributes of the IRR computation.

SUMMARY

The present disclosure thus includes a process for evaluating performance attribution in a private portfolio. Based at least in part on the discovery by the present inventors that an investment portfolio may be converted to a neutral-weight portfolio as described herein, the performance of a private investment portfolio can be analyzed to determine the contributions of investment selection, timing and manager's contribution. The disclosed process and system are thus an important tool in evaluating the investment ability of portfolio managers and to improve their performance.

The process includes:

(a) determining a return for the private portfolio by scaling the portfolio to a neutral weight portfolio with a common start date that is the earliest start date in the portfolio;

(b) determining a return for the private portfolio with actual investment weights with a common start date that is the earliest start date in the portfolio;

(c) determining a return for the private portfolio scaled to a neutral weight with actual start dates;

(d) determining a return for the private portfolio with actual weights and actual start dates;

(e) algebraically combining the returns of steps (a)–(c) to determine a manager's return; and (f) subtracting the manager's return from the portfolio index to determine performance attribution.

The disclosed system includes:

(a) means for determining a return for the private portfolio by scaling the portfolio to a neutral weight portfolio with a common start date that is the earliest start date in the portfolio;

(b) means for determining a return for the private portfolio with actual investment weights with a common start date that is the earliest start date in the portfolio;

(c) means for determining a return for the private portfolio scaled to a neutral weight with actual start dates;

(d) means for determining a return for the private portfolio with actual weights and actual start dates;

(e) means for algebraically combining the returns of steps (a)–(c) to determine a manager's return; and (f) means for subtracting the manager's return from the portfolio index to determine performance attribution.

The system described herein includes a central processing unit or CPU (processor), which may be a main-frame computer connected to one or more work stations, or it may be a component of a personal computer that may be a "stand alone" computer or it may be networked to other computers through a common server. The system also includes an input device such as a keyboard in communication with the processor, at least one memory source and software including instructions. The device may also include a display device such as a monitor in communication with the processor.

In the present disclosure, "algebraically combining" is understood to convey its ordinary meaning in the art, and as used in the examples herein, is the addition of numbers with positive and negative signs.

DETAILED DESCRIPTION

Calculation of Neutral-weight IRR

In a diversified portfolio setting, although the IRR of each investment is unchanged when all its cash flows are multiplied by a constant, multiplying or dividing each of the i period cash flows of each of j investments in a portfolio of m investments by a scaling factor $f_s$ changes the IRR of the portfolio to a constant value IRRk while leaving the IRR; of each investment unchanged. Thus, $$IRR_k = r_{pf} \text{ where } \sum_{i=0}^{n} \frac{\sum_{j=1}^{m} f_j CF_{i-i_0,j}}{(1+r_{pf})^{i-i_0}} = 0 \text{ and } f_j = \frac{k}{\sum_{i=0}^{n} NCF_{i,j}}$$

This is so because, as described above, the relative weight of each investment's contribution to the portfolio's cash flows is the same as a function of time. Since the relative weights are the same no matter what constant is used to scale the cash flows of the individual investments (i.e., the portfolio is neutrally weighted), the IRR of the neutral-weight (i.e., scaled) portfolio is a constant.

The numerical examples below make it clear that a neutral-weight portfolio, in which the cash flows of all investments in a portfolio are scaled to a common constant, has two important financial and mathematical characteristics: the IRRs of the individual investments are unchanged; and the portfolio's IRR is a constant no matter what factor is used to scale the portfolio to a neutral weight. For example, all the scaled portfolios have the common IRR of 45.9%.

| | Actual | | |
|---|---|---|---|
| Period | Invstmnt 1 | Invstmnt 2 | Portfolio |
| Jan. 1, 2000 | $ (4) | $ — | $ (4) |
| Jan. 1, 2001 | $ 2 | $ (2) | $ — |
| Jan. 1, 2002 | $ (8) | $ 3 | $ (5) |
| Jan. 1, 2003 | $ — | $ (8) | $ (8) |

-continued

| | | | | | | |
|---|---|---|---|---|---|---|
| Jan. 1, 2004 | $ | 14 | $ | — | $ | 14 |
| Jan. 1, 2005 | $ | — | $ | 35 | $ | 35 |
| | $ | 4 | $ | 28 | $ | 32 |
| IRR | | 13.435% | | 91.074% | | 43.1% |

| | Pro Forma Scaled to Mean | | |
|---|---|---|---|
| Period | Invstmnt 1 | Invstmnt 2 | Portfolio |
| Jan. 1, 2000 | $ (3.7) | $ — | $ (3.7) |
| Jan. 1, 2001 | $ 1.8 | $ (2.2) | $ (0.4) |
| Jan. 1, 2002 | $ (7.3) | $ 3.3 | $ (4.0) |
| Jan. 1, 2003 | $ — | $ (8.8) | $ (8.8) |
| Jan. 1, 2004 | $ 12.8 | $ — | $ 12.8 |
| Jan. 1, 2005 | $ — | $ 38.5 | $ 38.5 |
| | $ 3.7 | $ 30.8 | $ 34.5 |
| IRR | 13.4% | 91.074% | 45.9% |

| $ (2.0) | Pro Forma Scaled to Arbitrary | | |
|---|---|---|---|
| Period | Invstmnt 1 | Invstmnt 2 | Portfolio |
| Jan. 1, 2000 | $ (0.7) | $ — | $ (0.7) |
| Jan. 1, 2001 | $ 0.3 | $ (0.4) | $ (0.1) |
| Jan. 1, 2002 | $ (1.3) | $ 0.6 | $ (0.7) |
| Jan. 1, 2003 | $ — | $ (1.6) | $ (1.6) |
| Jan. 1, 2004 | $ 2.3 | $ — | $ 2.3 |
| Jan. 1, 2005 | $ — | $ 7.0 | $ 7.0 |
| | $ 0.7 | $ 5.6 | $ 6.3 |
| IRR | 13.4% | 91.074% | 45.9% |

| | Pro Forma Scaled to Inv 1 | | |
|---|---|---|---|
| Period | Invstmnt 1 | Invstmnt 2 | Portfolio |
| Jan. 1, 2000 | $ (4.0) | $ — | $ (4.0) |
| Jan. 1, 2001 | $ 2.0 | $ (2.4) | $ (0.4) |
| Jan. 1, 2002 | $ (8.0) | $ 3.6 | $ (4.4) |
| Jan. 1, 2003 | $ — | $ (9.6) | $ (9.6) |
| Jan. 1, 2004 | $ 14.0 | $ — | $ 14.0 |
| Jan. 1, 2005 | $ — | $ 42.0 | $ 42.0 |
| | $ 4.0 | $ 33.6 | $ 37.6 |
| IRR | 13.4% | 91.074% | 45.9% |

| | Pro Forma Scaled to Inv 2 | | |
|---|---|---|---|
| Period | Invstmnt 1 | Invstmnt 2 | Portfolio |
| Jan. 1, 2000 | $ (3.3) | $ — | $ (3.3) |
| Jan. 1, 2001 | $ 1.7 | $ (2.0) | $ (0.3) |
| Jan. 1, 2002 | $ (6.7) | $ 3.0 | $ (3.7) |
| Jan. 1, 2003 | $ — | $ (8.0) | $ (8.0) |
| Jan. 1, 2004 | $ 11.7 | $ — | $ 11.7 |
| Jan. 1, 2005 | $ — | $ 35.0 | $ 35.0 |
| | $ 3.3 | $ 28.0 | $ 31.3 |
| IRR | 13.4% | 91.074% | 45.9% |

Another way of stating the relationship of a neutral-weight portfolio's constant IRR to the constant IRR of a single investment's cash flows is shown in the following numerical example/diagram, in which the vertical arrow shows the latter and the horizontal arrows show that the former is equivalent to the latter:

| $ (2.0) | Pro Forma Scaled to Arbitrary | | |
|---|---|---|---|
| Period | Invstmnt 1 | Invstmnt 2 | Portfolio |
| 1/1/00 | $ (0.7) | $ - | $ (0.7) |
| 1/1/01 | $ 0.3 | $ (0.4) | $ (0.1) |
| 1/1/02 | $ (1.3) | $ 0.6 | $ (0.7) |
| 1/1/03 | $ - | $ (1.6) | $ (1.6) |
| 1/1/04 | $ 2.3 | $ - | $ 2.3 |
| 1/1/05 | $ - | $ 7.0 | $ 7.0 |
| | $ 0.7 | $ 5.6 | $ 6.3 |
| IRR | 13.4% | 91.074% | 45.9% |

In summary, scaling the cash flows of each of a portfolio's investments to a common standard results in a neutral-weight portfolio. In a neutral-weight portfolio, the portfolio's cash flows are made up of equally-weighted investments, thus removing the effects of the relative dollar weighting of the investments from the portfolio IRR. Because the relative weights of the investments are eliminated as an influence on IRR, the portfolio IRR is a constant, no matter what weighting scheme is used.

The investment meaning of the neutral-weight portfolio's constant IRR can be used as a performance diagnostic by comparing it to the conventional portfolio IRR. The difference between the two is caused by the relative weighting of investments (or, in public stock terms, stock selection). In private market terms, this comparison determines the relative efficiency with which the managers invested their capital. If the neutral-weight portfolio's IRR is less than the conventional portfolio IRR, the managers invested more money in the best-performing transactions and less money in the worst-performing transactions. Conversely, if the neutral-weight portfolio IRR is greater than the conventional portfolio IRR, the managers invested more money in the worst-performing transactions and less money in the best-performing transactions. Obviously, the former is preferable to the latter in terms of investment efficiency.

For all the reasons cited above as to why the neutral-weight portfolio's IRR is constant, the times money earned measure is also different from actual and is also a constant. In the same fashion as cited in the previous paragraph, a times money earned measure in the actual portfolio that is greater than that of the neutral-weight portfolio indicates that the managers invested more money in the best-performing transactions and less money in the worst-performing transactions. Conversely, if the neutral-weight portfolio times money measure is greater than the conventional portfolio times money, the managers invested more money in the worst-performing transactions and less money in the best-performing transactions. Again, the former is preferable to the latter in terms of investment efficiency.

Means for Using the Neutral-weight Portfolio's Constant IRR and Both the Zero-based IRR and Actual IRR to Calculate Private Investment Performance Attribution The following disclosure shows in detail the use of the neutral-weight portfolio's constant IRR, as calculated above, and both the zero-based IRR and actual IRR, as calculated in the Background Section above, to analyze performance attribution in the private markets in terms of 1. relative weighting of investments (i.e., stock selection, whether the managers put more money in the better transactions);
2. relative timing of investments (i.e., whether the managers' track record reflects fortunate timing, rather than investment skill); and
3. the manager's return against the portfolio index (as defined in the box below).

In order to analyze performance in these terms, the following is needed:

|  | $ | t |  |  |
|---|---|---|---|---|
| I | Neutral weight | Zero-based | Portfolio index = neutral-weight portfolio w/zero-based start date | 52.8% |
| II | Actual | Zero-based | Actual weights, w/common start date | 49.4% |
| III | Neutral weight | Actual | Neutral-weight portfolio, w/actual start dates | 45.9% |
| IV | Actual | Actual | Actual weights, w/actual start dates (conventional IRR) | 43.1% |

I. Using both the neutral-weight portfolio IRR and the time zero IRR together eliminates both time and investment weighting. The return to the portfolio eliminating the effects of both weighting/investment selection and timing results in a custom index of investments using the portfolio as the investment universe. Using the same figures as the Pro Forma Scaled to Arbitrary numerical example above:

| | Scaled and Zero-Based | | |
|---|---|---|---|
| Period | Invstmnt 1 | Invstmnt 2 | Portfolio |
| Jan. 1, 2000 | $ (0.7) | $ (0.4) | $ (1) |
| Jan. 1, 2001 | $ 0.3 | $ 0.6 | $ 1 |
| Jan. 1, 2002 | $ (1.3) | $ (1.6) | $ (3) |
| Jan. 1, 2003 | $ — | $ — | $ — |
| Jan. 1, 2004 | $ 2.3 | $ 7.0 | $ 9 |
| Jan. 1, 2005 | $ — | $ — | $ — |
| | $ 0.7 | $ 5.6 | $ 6.3 |
| IRR | 13.435% | 91.101% | 52.8% |

II. As mentioned in the Background Section above, the so-called time-zero IRR calculation restates all the investments in a portfolio to a common start date. The portfolio effect is to eliminate the relative timing of each of the investments in determining portfolio IRR. For example, using the same investment figures as the Actual numerical example above:

| | Zero-Based | | |
|---|---|---|---|
| Period | Invstmnt 1 | Invstmnt 2 | Portfolio |
| Jan. 1, 2000 | $ (4) | $ (2) | $ (6) |
| Jan. 1, 2001 | $ 2 | $ 3 | $ 5 |
| Jan. 1, 2002 | $ (8) | $ (8) | $ (16) |
| Jan. 1, 2003 | $ — | $ — | $ — |
| Jan. 1, 2004 | $ 14 | $ 35 | $ 49 |
| Jan. 1, 2005 | $ — | $ — | $ — |
| | $ 4 | $ 28 | $ 32 |
| IRR | 13.435% | 91.101% | 49.4% |

III. The art in Calculation of neutral-weight IRR gives equal weight to each investment in a portfolio, eliminating the effect of the relative weight of each investment in determining IRR and thus yielding a constant portfolio IRR. If more money has been invested in the poorest investments, the actual IRR of the portfolio will be less than the portfolio scaled IRR. If more money has been invested in the best investments, the actual IRR will be greater than the portfolio scaled IRR. Using the numerical example cited above,

| | Pro Forma Scaled to Inv 1 | | |
|---|---|---|---|
| Period | Invstmnt 1 | Invstmnt 2 | Portfolio |
| Jan. 1, 2000 | $ (4.0) | $ — | $ (4.0) |
| Jan. 1, 2001 | $ 2.0 | $ (2.4) | $ (0.4) |
| Jan. 1, 2002 | $ (8.0) | $ 3.6 | $ (4.4) |
| Jan. 1, 2003 | $ — | $ (9.6) | $ (9.6) |
| Jan. 1, 2004 | $ 14.0 | $ — | $ 14.0 |
| Jan. 1, 2005 | $ — | $ 42.0 | $ 42.0 |
| | $ 4.0 | $ 33.6 | $ 37.6 |
| IRR | 13.4% | 91.074% | 45.9% |

Since the 45.9% IRR of the neutral-weight portfolio exceeds the 43.1% IRR of the manager's portfolio, the example shows that the manager's stock selection (i.e., relative weighting of the investments in the portfolio) actually detracted from returns. In other words, naive or neutral weighting would have yielded superior returns to the actual weighting of the portfolio's investments.

IV. The actual portfolio return, using the numerical example cited above is as follows:

| | Actual | | |
|---|---|---|---|
| Period | Invstmnt 1 | Invstmnt 2 | Portfolio |
| 1/1/00 | $(4) | $— | $(4) |
| 1/1/01 | $2 | $(2) | $— |
| 1/1/02 | $(8) | $3 | $(5) |
| 1/1/03 | $— | $(8) | $(8) |
| 1/1/04 | $14 | $— | $14 |
| 1/1/05 | $— | $35 | $35 |
| | $4 | $28 | $32 |
| IRR | 13.435% | 91.074% | 43.1% |

With these figures known, the manager's performance is analyzed as follows:

| I | Portfolio index | 52.8% |
|---|---|---|
| II–I | Selection (relative weighting) | −3.3% |
| IV–II | Timing | −6.4% |
| IV | Manager's return | 43.1% |
| IV–I | Manager's contribution | −9.7% |

The IRRs total properly to the manager's return in this analysis, a property derived from the fact that the selection IRR and timing IRR each have only a single changed parameter, whether dollar weight or time, from the line immediately preceding. Put another way, these IRRs foot properly because there are no intervening unexplained factors relating to performance.

The invention claimed is:
1. A process for determining a numerical value of a manager's performance in a private portfolio comprising:

(a) determining an internal rate of return for the private portfolio by scaling the portfolio to a neutral weight portfolio with a common start date that is the earliest start date in the portfolio;
(b) determining an internal rate of return for the private portfolio with actual investment weights with a common start date that is the earliest start date in the portfolio;
(c) determining an internal rate of return for the private portfolio scaled to a neutral weight with actual start dates;
(d) determining an internal rate of return for the private portfolio with actual weights and actual start dates;
(e) algebraically combining the internal rates of return of steps (a)–(c) to determine a manager's return; and
(f) subtracting the manager's return from a portfolio index to produce a numerical value of the manager's performance,
wherein the portfolio index is the internal rate of return of a neutral-weight portfolio with zero-based start date.

2. A computer system for determining a numerical value of a manager's performance in a private portfolio comprising:
(a) means for determining an internal rate of return for the private portfolio by scaling the portfolio to a neutral weight portfolio with a common start date that is the earliest start date in the portfolio;
(b) means for determining an internal rate of return for the private portfolio with actual investment weights with a common start date that is the earliest start date in the portfolio;
(c) means for determining an internal rate of return for the private portfolio scaled to a neutral weight with actual start dates;
(d) means for determining an internal rate of return for the private portfolio with actual weights and actual start dates;
(e) means for algebraically combining the returns of steps (a)–(c) to determine a manager-s return; and
(f) means for subtracting the manager's return from a portfolio index to produce a numerical value of the manager's performance,
wherein the portfolio index is the internal rate of return of a neutral-weight portfolio with zero-based start date.

3. A computer system for determining a numerical value of a manager's performance in a private portfolio comprising:
a processor and
a memory including software instructions adapted to enable the computer system to perform:
(a) determining an internal rate of return for the private portfolio by scaling the portfolio to a neutral weight portfolio with a common start date that is the earliest start date in the portfolio;
(b) determining an internal rate of return for the private portfolio with actual investment weights with a common start date that is the earliest start date in the portfolio;
(c) determining an internal rate of return for the private portfolio scaled to a neutral weight with actual start dates;
(d) determining an internal rate of return for the private portfolio with actual weights and actual start dates;
(e) algebraically combining the returns of steps (a)–(c) to determine a manager's return; and
(f) subtracting the manager's return from a portfolio index to produce a numerical value of the manager's performance,
wherein the portfolio index is the internal rate of return of a neutral-weight portfolio with zero-based start date.

* * * * *